United States Patent
Riley

(10) Patent No.: US 8,176,204 B2
(45) Date of Patent: May 8, 2012

(54) SYSTEM AND METHOD FOR MULTI-HOST SHARING OF A SINGLE-HOST DEVICE

(75) Inventor: Dwight D. Riley, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1734 days.

(21) Appl. No.: 11/450,491

(22) Filed: Jun. 9, 2006

(65) Prior Publication Data

US 2006/0230181 A1 Oct. 12, 2006

Related U.S. Application Data

(63) Continuation-in-part of application No. 11/078,851, filed on Mar. 11, 2005.

(51) Int. Cl.
*G06F 15/173* (2006.01)
(52) U.S. Cl. .................................. 709/239; 709/238
(58) Field of Classification Search .................. 709/239, 709/238
See application file for complete search history.

(56) References Cited

U.S. PATENT DOCUMENTS

| | | | |
|---|---|---|---|
| 6,067,590 A | 5/2000 | Pettey et al. | |
| 6,266,731 B1 | 7/2001 | Riley et al. | |
| 6,473,403 B1 * | 10/2002 | Bare | 370/236 |
| 6,557,068 B2 | 4/2003 | Riley et al. | |
| 6,618,777 B1 * | 9/2003 | Greenfield | 710/120 |
| 6,816,934 B2 | 11/2004 | Riley et al. | |
| 7,251,704 B2 * | 7/2007 | Solomon et al. | 710/316 |
| 7,752,346 B2 * | 7/2010 | Talayco et al. | 710/9 |
| 2003/0065863 A1 * | 4/2003 | Wyland | 710/305 |
| 2004/0003162 A1 | 1/2004 | Chan et al. | |
| 2004/0024944 A1 | 2/2004 | Riley | |
| 2004/0030766 A1 * | 2/2004 | Witkowski | 709/223 |
| 2005/0033893 A1 | 2/2005 | Pettey et al. | |
| 2005/0157700 A1 | 7/2005 | Riley | |
| 2005/0238035 A1 | 10/2005 | Riley | |

OTHER PUBLICATIONS

"Architectures and Infrastructures for Blade Computing," Sun Microsystems White Paper, Sep. 2002, 17 pp. [Online] http://www.sun.com/servers/white-papers/blades_wp3.pdf.
Phil Hochmuth, "Vendors push switch standard," Network World, Feb. 2, 2004, 2 pp. [Online] http://www.networkworld.com/news/2004/0202infinterconnect.html.
Tim Miller, "PCI Express Base is just the beginning," CompactPCI and Advanced TCA Systems, Jul. 2003, 4 pp. [Online] http://www.compactpci-systems.com/columns/PCI_express/pdfs/7.03.pdf.
Akber Kazmi, "Non-Transparent Bridging Makes PCI-Express HA Friendly," CommsDesign, Aug. 14, 2003, 6 pp. [Online] http://www.commsdesign.com/design_corner/showArticle.jhtml?articleID=16501767. Akber Kazmi, "PCI Express and Non-Transparent Bridging Support High Availability," Embedded Computing Design, Winter 2004, 4 p. [Online] http://www.embedded-computing.com/pdfs/PLXTech.Win04.pdf.
"Realizing the Full Potential of Server, Switch & I/O Blades with InfiniBand Architecture," Mellanox Technologies White Paper, 11 p. [Online] http://www.mellanox.com/technology/shared/Blade_WP_120.pdf.

\* cited by examiner

*Primary Examiner* — Jeffrey Pwu
*Assistant Examiner* — Shripal Khajuria

(57) ABSTRACT

The present disclosure describes a system and method for multi-host extension of a single-host device comprising a network switch fabric that comprises a rooted hierarchical bus, a first compute node coupled to the network switch fabric, and an input/output (I/O) node coupled to the network switch fabric, the I/O node comprising a network switch fabric interface and a real single-host device. The network switch fabric interface creates a first virtual device mapped to the real single-host device. The first virtual device allows the first compute node to access the real single-host device.

24 Claims, 15 Drawing Sheets

SYSTEM AND METHOD FOR MULTI-HOST SHARING OF A SINGLE-HOST DEVICE

CROSS-REFERENCE TO RELATED APPLICATION

The present application is a continuation-in-part of, and claims priority to, co-pending application Ser. No. 11/078,851, filed Mar. 11, 2005, and entitled "System and Method for a Hierarchical Interconnect Network," which is hereby incorporated by reference.

BACKGROUND

Ongoing advances in distributed multi-processor computer systems have continued to drive improvements in the various technologies used to interconnect processors, as well as their peripheral components. As the speed of processors has increased, the underlying interconnect, intervening logic, and the overhead associated with transferring data to and from the processors have all become increasingly significant factors impacting performance. Performance improvements have been achieved through the use of faster networking technologies (e.g., Gigabit Ethernet), network switch fabrics (e.g., Infiniband, and RapidIO), TCP offload engines, and zero-copy data transfer techniques (e.g., remote direct memory access).

Efforts have also been increasingly focused on improving the performance, efficient use and allocation of peripheral input/output (I/O) devices (e.g., network interfaces and disk drives) within computer systems. Such improvements have been achieved in part through the use of shared network-attached I/O devices and shared I/O devices directly coupled to switch fabrics. However, both network-attached I/O devices and shared I/O devices directly coupled to switch fabrics may add communication protocol layers that can adversely affect performance, and often require the use of proprietary hardware and software. Further, many I/O devices can only be utilized by, or associated with, one processor at a time. This may necessitate the use of a number of shared I/O devices that are dynamically allocated to a processor, thus adding additional overhead associated with the allocation and deallocation of the I/O device. This overhead can also adversely affect the overall performance of a system.

BRIEF DESCRIPTION OF THE DRAWINGS

For a detailed description of exemplary embodiments of the invention, reference will now be made to the accompanying drawings in which.

NOTATION AND NOMENCLATURE

Figure 1A:
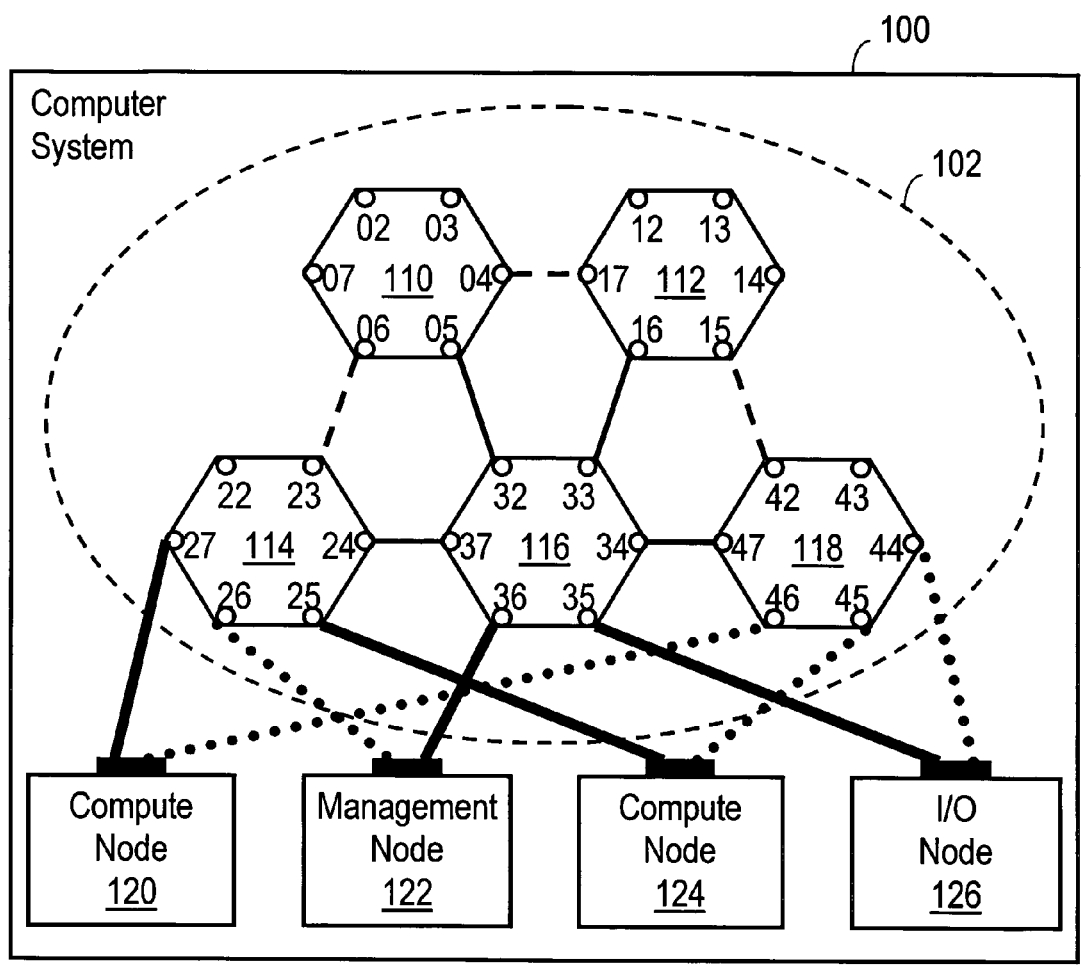
FIG. 1A shows a computer system constructed in accordance with at least some embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct electrical connection. Thus, if a first device couples to a second device, that connection may be through a direct electrical connection, or through an indirect electrical connection via other devices and connections. Additionally, the term "software" refers to any executable code capable of running on a processor, regardless of the media used to store the software. Thus, code stored in non-volatile memory, and sometimes referred to as "embedded firmware," is within the definition of software. Further, the term "system" refers to a collection of two or more parts and may be used to refer to a computer or networking system or a portion of a computer or networking system.

The term "virtual machine" refers to a simulation, emulation or other similar functional representation of a computer system, whereby the virtual machine comprises one or more functional components that are not constrained by the physical boundaries that define one or more real or physical computer systems. The functional components comprise real or physical devices, interconnect busses and networks, as well as software programs executing on one or more CPUs. A virtual machine may, for example, comprise a sub-set of functional components that include some but not all functional components within a real or physical computer system, may comprise some functional components of multiple real or physical computer systems, may comprise all the functional components of one real or physical computer system, but only some components of another real or physical computer system, or may comprise all the functional components of multiple real or physical computer systems. Many other combinations are possible, and all such combinations are intended to be within the scope of the present disclosure.

Similarly, the term "virtual bus" refers to a simulation, emulation or other similar functional representation of a computer bus, whereby the virtual bus comprises one or more functional components that are not constrained by the physical boundaries that define one or more real or physical computer busses. Likewise, the term "virtual device" refers to a simulation, emulation or other similar functional representation of a real or physical computer device, whereby the virtual device comprises one or more functional components that are not constrained by the physical boundaries that define one or more real or physical computer devices. Like a virtual machine, both a virtual bus and a virtual device may comprise any number of combinations of some or all of the functional components of one or more physical or real busses or devices, respectively, and the functional components may comprise any number of combinations of hardware devices and software programs. Many combinations, variations and modifications will be apparent to those skilled in the art, and all are intended to be within the scope of the present disclosure.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Interconnect busses have been increasingly extended to operate as network switch fabrics within scalable, high-availability computer systems (e.g., blade servers). These computer systems may comprise several components or "nodes" that are interconnected by the switch fabric. The switch fabric may provide redundant or alternate paths that interconnect the nodes and allow them to exchange data. FIG. 1A illustrates a computer system 100 with a switch fabric 102 comprising switches 110 through 118 and constructed in accordance with at least some embodiments. The computer system 100 also comprises compute nodes 120 and 124, management node 122, and input/output (I/O) node 126.

Each of the nodes within the computer system 100 couples to at least two of the switches within the switch fabric. Thus, in the embodiment illustrated in FIG. 1A, compute node 120 couples to both port 27 of switch 114 and port 46 of switch 118; management node 122 couples to port 26 of switch 114 and port 36 of switch 116; compute node 124 couples to port 25 of switch 114 and port 45 of switch 118; and I/O node 126 couples to port 35 of switch 116 and port 44 of switch 118.

By providing both an active and alternate path a node can send and receive data across the switch fabric over either path based on such factors as switch availability, path latency, and network congestion. Thus, for example, if management node 122 needs to communicate with I/O node 126, but switch 116 has failed, the transaction can still be completed by using an alternate path through the remaining switches. One such path, for example, is through switch 114 (ports 26 and 23), switch 110 (ports 06 and 04), switch 112 (ports 17 and 15), and switch 118 (ports 42 and 44).

Figure 1B:
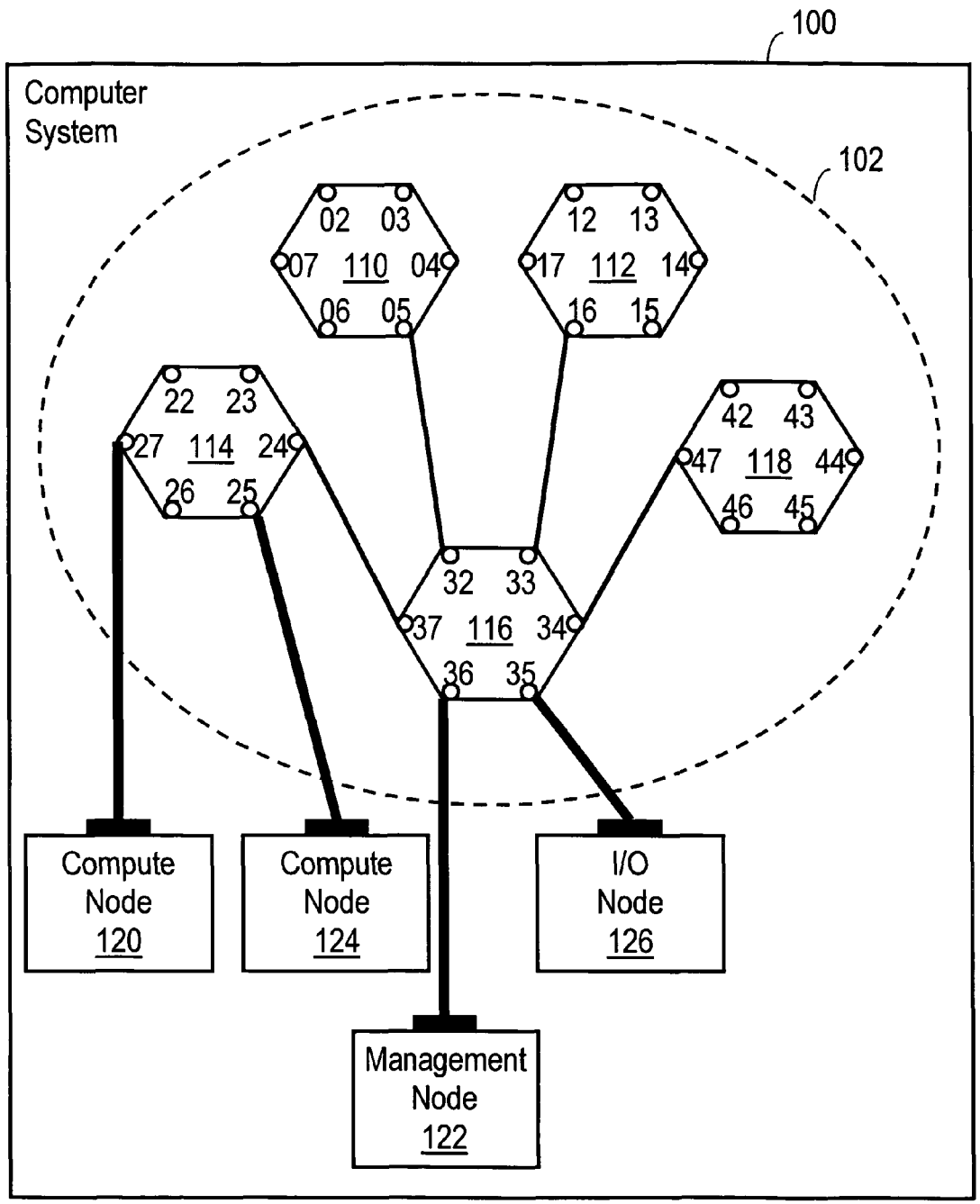
FIG. 1B shows the underlying rooted hierarchical structure of a switch fabric within a computer system constructed in accordance with at least some embodiments.

Because the underlying rooted hierarchical bus structure of the switch fabric 102 (rooted at management node 122 and illustrated in FIG. 1B) does not support alternate paths as described, extensions to identify alternate paths are provided to the process by which each node and switch port is mapped within the hierarchy upon initialization of the switch fabric 102 of the illustrative embodiment shown. These extensions may be implemented within the switches so that hardware and software installed within the various nodes of the computer system 100, and already compatible with the underlying rooted hierarchical bus structure of the switch fabric 102, can be used in conjunction with the switch fabric 102 with little or no modification.

Figure 2:
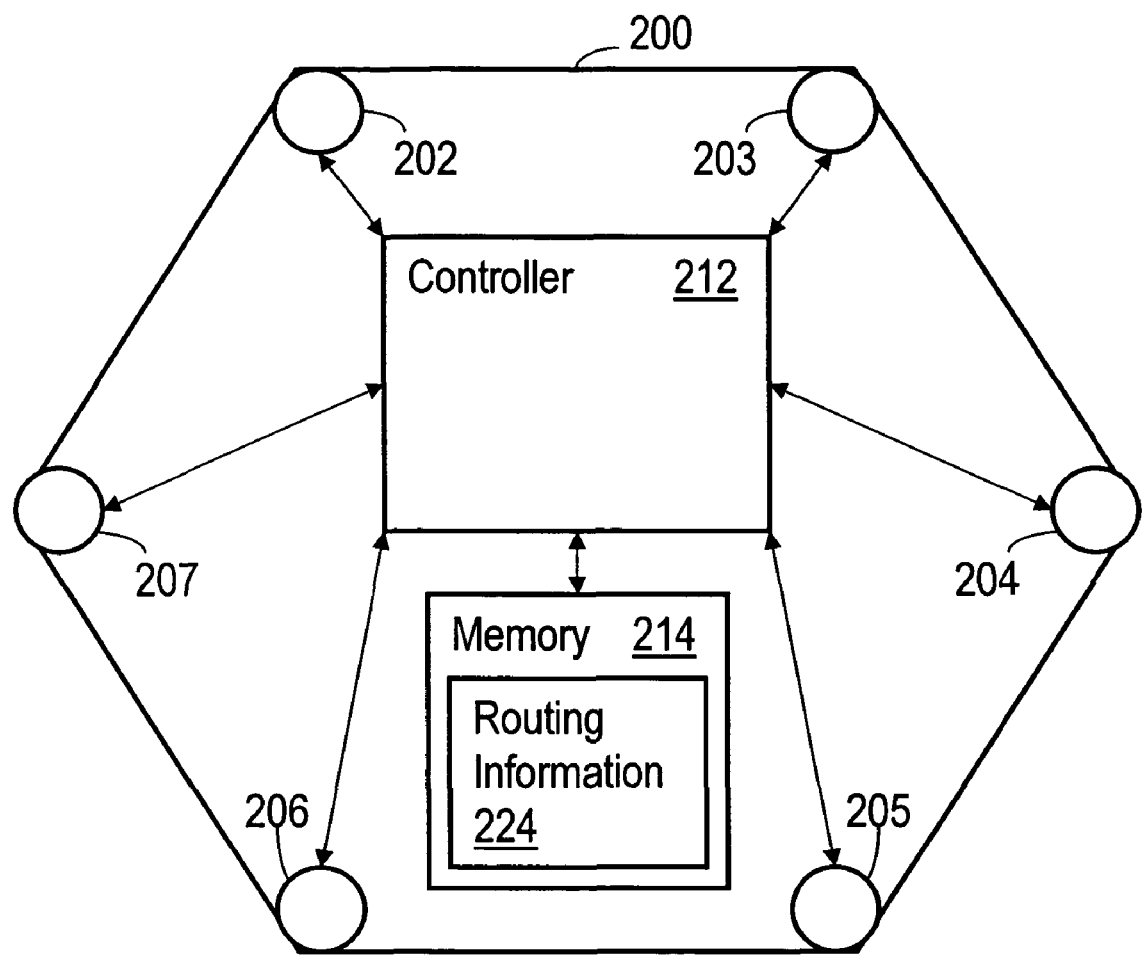
FIG. 2 shows a network switch constructed in accordance with at least some embodiments.

FIG. 2 illustrates a switch 200 implementing such extensions for use within a switch fabric, and constructed in accordance with at least some illustrative embodiments. The switch 200 comprises a controller 212 and memory 214, as well as a plurality of communication ports 202 through 207. The controller 212 couples to the memory 214 and each of the communication ports. The memory 214 comprises routing information 224. The controller 212 determines the routing information 224 upon initialization of the switch fabric and stores it in the memory 214. The controller 212 later uses the routing information 224 to identify alternate paths. The routing information 224 comprises whether a port couples to an alternate path, and if it does couple to an alternate path, which endpoints within the computer system 100 are accessible through that alternate path.

In at least some illustrative embodiments the controller 212 is implemented as a state machine that uses the routing information based on the availability of the active path. In other embodiments, the controller 212 is implemented as a processor that executes software (not shown). In such a software-driven embodiment the switch 200 is capable of using the routing information based on the availability of the active path, and is also capable of making more complex routing decisions based on factors such as network path length, network traffic, and overall data transmission efficiency and performance. Other factors and combinations of factors may become apparent to those skilled in the art, and such variations are intended to be within the scope of this disclosure.

Figure 3:
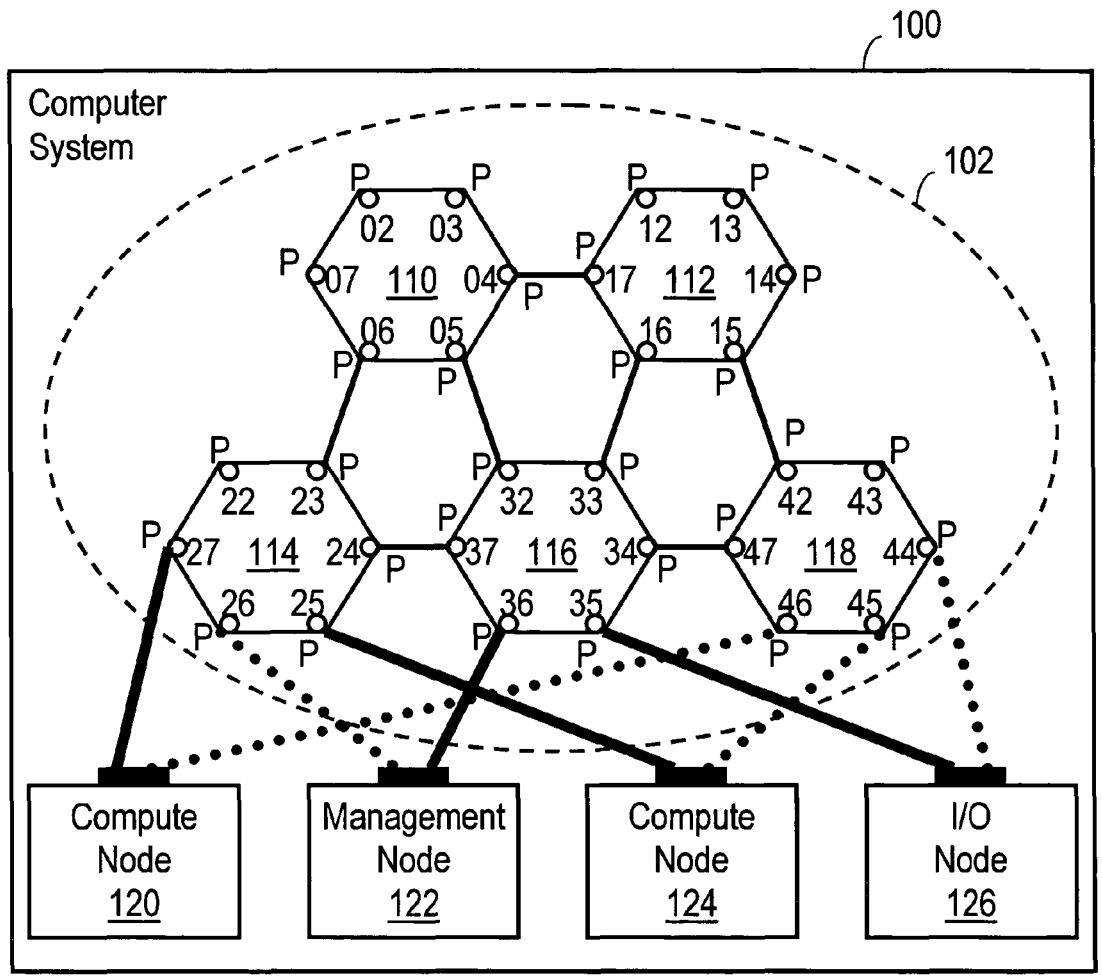
FIG. 3 shows the state of a computer system constructed in accordance with at least some embodiments after a reset.
Figure 4:
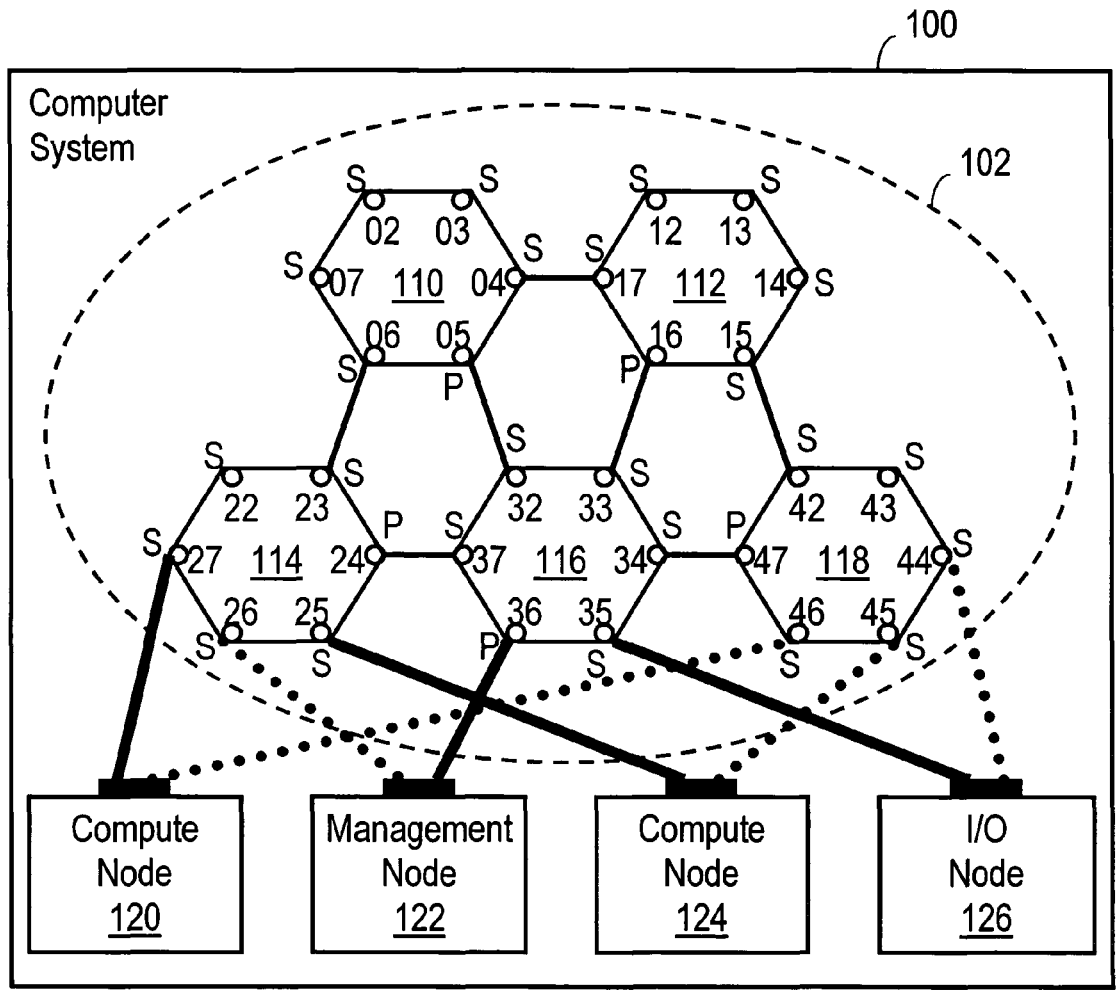
FIG. 4 shows the state of a computer system constructed in accordance with at least some embodiments after identifying the secondary ports.
Figure 5:
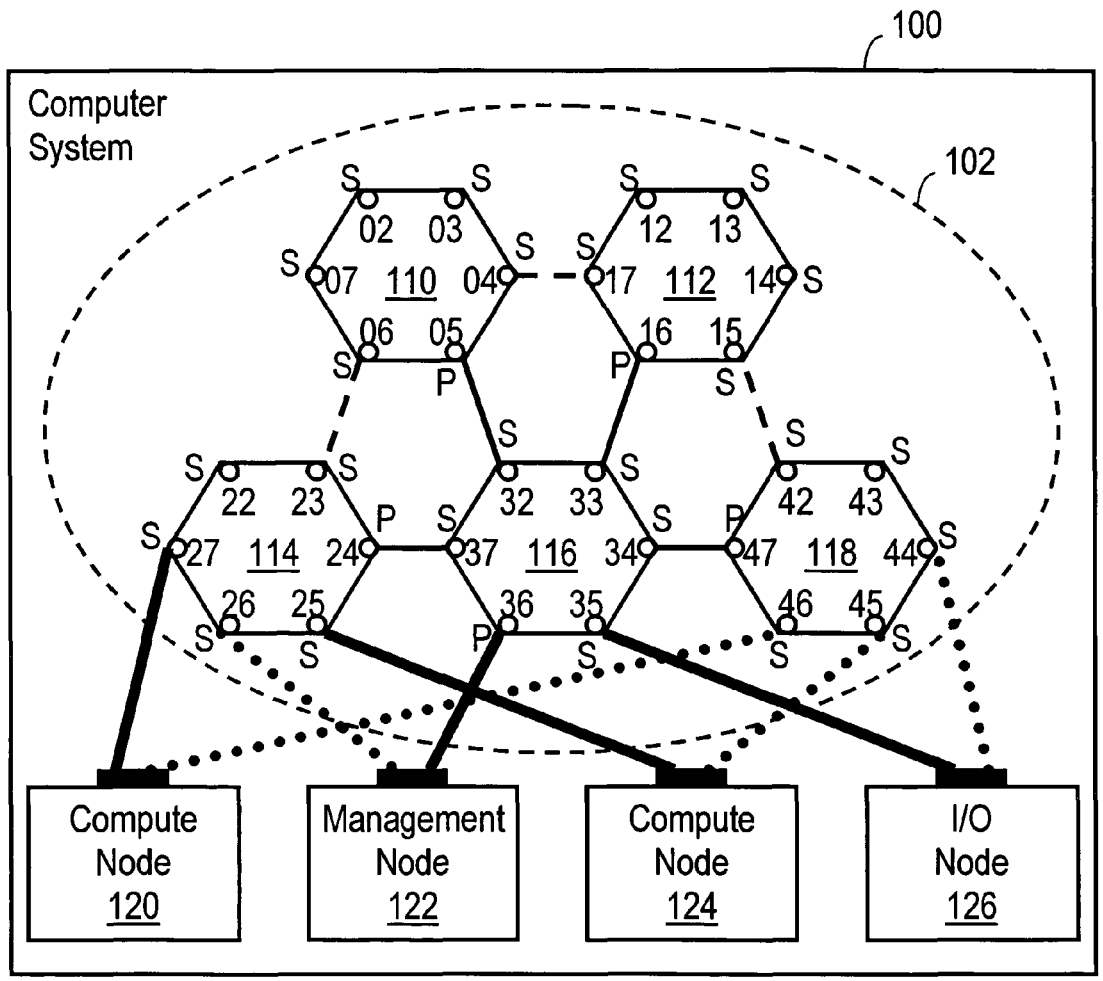
FIG. 5 shows the state of a computer system constructed in accordance with at least some embodiments after designating the alternate paths.

The initialization of the switch fabric may vary depending upon the underlying rooted hierarchical bus architecture. FIGS. 3 through 5 illustrate initialization of a switch fabric based upon a peripheral component interconnect (PCI) architecture and in accordance with at least some illustrative embodiments. Referring to FIG. 3, upon resetting the computer system 100, each of the switches 110 through 118 identifies each of their ports as primary ports (designated by a "P" in FIG. 3). Similarly, the paths between the switches are initially designated as active paths. The management node then begins a series of one or more configuration cycles in which each switch port and endpoint within the hierarchy is identified (referred to in the PCI architecture as "enumeration"), and in which the primary bus coupled to the management node is designated as the root bus. Each configuration cycle comprises accessing configuration data stored in the each device coupled to the switch fabric (e.g., the PCI configuration space of a PCI device). The switches comprise data related to devices that are coupled to the switch. If the configuration data regarding other devices stored by the switch is not complete, the management node initiates additional configuration cycles until all devices coupled to the switch have been identified and the configuration data within the switch is complete.

Referring now to FIG. 4, when switch 116 detects that the management node 122 has initiated a first valid configuration cycle on the root bus, switch 116 identifies all ports not coupled to the root bus as secondary ports (designated by an "S" in FIG. 4). Subsequent valid configuration cycles may be propagated to each of the switches coupled to the secondary ports of switch 116, causing those switches to identify as secondary each of their ports not coupled to the switch propagating the configuration cycle (here switch 116). Thus, switch 116 will end up with port 36 identified as a primary port, and switches 110, 112, 114, and 118 with ports 05, 16, 24, and 47 identified as primary ports, respectively.

As ports are identified during each valid configuration cycle of the initialization process, each port reports its configuration (primary or secondary) to the port of any other switch to which it is coupled. Once both ports of two switches so coupled to each other have initialized, each switch determines whether or not both ports have been identified as secondary. If at least one port has not been identified as a secondary port, the path between them is designated as an active path within the bus hierarchy. If both ports have been identified as secondary ports, the path between them is designated as a redundant or alternate path. Routing information regarding other ports or endpoints accessible through each switch (segment numbers within the PCI architecture) is then exchanged between the two ports at either end of the path coupling the ports, and each port is then identified as an endpoint within the bus hierarchy. The result of this process is illustrated in FIG. 5, with the redundant or alternate paths shown by dashed lines between coupled secondary switch ports.

Figure 6:
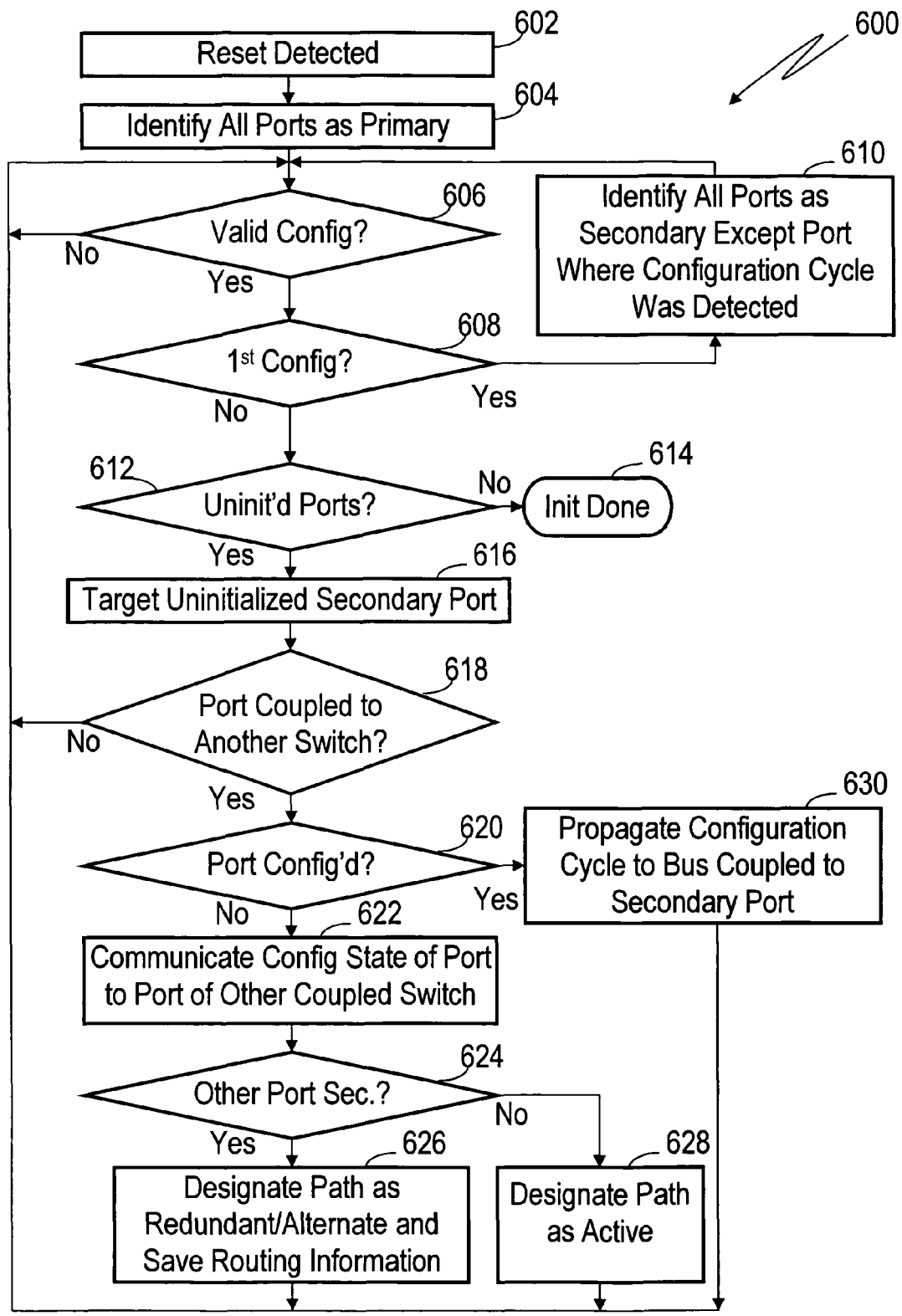
FIG. 6 shows an initialization method in accordance with at least some embodiments.

FIG. 6 illustrates initialization method 600 usable in a switch built in accordance with at least some illustrative embodiments. After the switch detects a reset in block 602 all the ports of the switch are identified as primary ports as shown in block 604. A wait state is entered in block 606 until the switch detects a valid configuration cycle. If the detected configuration cycle is the first valid configuration cycle (block 608), the switch identifies as secondary all ports other than the port on which the configuration cycle was detected, as shown in block 610.

After processing the first valid configuration cycle, subsequent valid configuration cycles may cause the switch to initialize the remaining uninitialized secondary ports on the switch. If no uninitialized secondary ports are found (block 612) the initialization method 600 is complete (block 614). If an uninitialized secondary port is targeted for enumeration (blocks 612 and 616) and the targeted secondary port is not coupled to another switch (block 618), no further action on the selected secondary port is required (the selected secondary port is initialized).

If the secondary port targeted in block 616 is coupled to a subordinate switch (block 618) and the targeted secondary port has not yet been configured (block 620), the targeted secondary port communicates its configuration state to the port of the subordinate switch to which it couples (block 622). If the port of the subordinate switch is also a secondary port (block 624) the path between the two ports is designated as a redundant or alternate path and routing information associated with the path (e.g., bus segment numbers) is exchanged between the switches and saved (block 626). If the port of the other switch is not a secondary port (block 624) the path between the two ports is designated as an active path (block 628) using PCI routing. The subordinate switch then toggles all ports other than the active port to a redundant/alternate state (i.e., toggles the ports, initially configured by default as primary ports, to secondary ports). After configuring the path as either active or redundant/alternate, the port is configured and the process is repeated by again waiting for a valid configuration cycle in block 606.

When all ports on all switches have been configured, the hierarchy of the bus is fully enumerated. Multiple configuration cycles may be needed to complete the initialization process. After a selected secondary port has been initialized, the process is again repeated for each port on the switch and each of the ports of all subordinate switches.

Once the initialization process has completed and the computer system begins operation, data packets may be routed as needed through alternate paths identified during initialization. For example, referring again to FIG. 5, when a data packet is sent by management node 122 to I/O node 126, it is routed from port 36 to port 34 of switch 116. But if switch 116 were to fail, management node 122 would then attempt to send its data packet through switch 114 (via the node's secondary path to that switch). Without switch 116, however there is no remaining active path available and an alternate path must be used. When the data packet reaches switch 114, the extended information stored in the switch (e.g., routing table information such as the nearest bus segment number) indicates that port 23 is coupled to a switch that is part of an alternate path leading to I/O node 126. The data packet is then routed to port 23 and forwarded to switch 110. Each intervening switch then repeats the routing process until the data packet reaches its destination.

Figure 7:
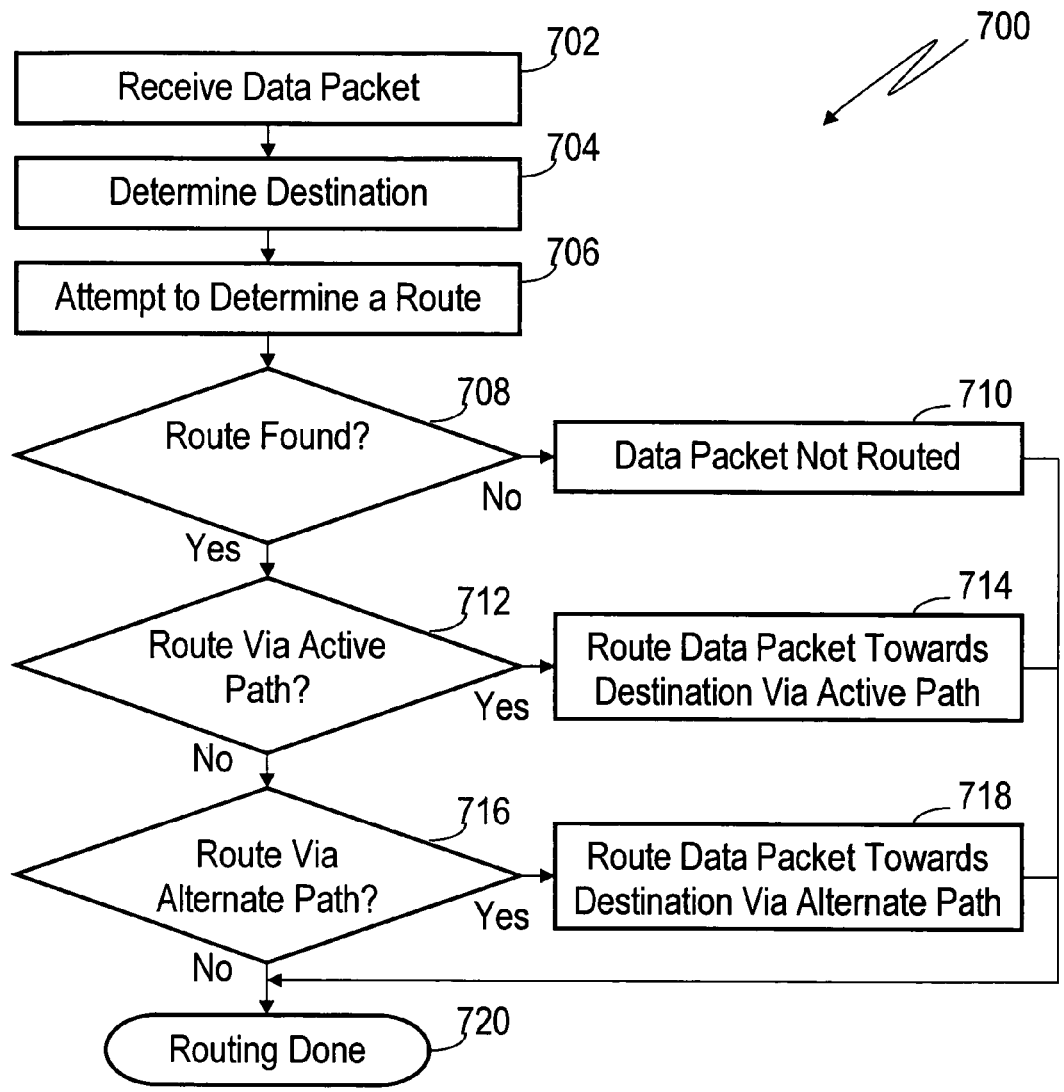
FIG. 7 shows a routing method in accordance with at least some embodiments.

FIG. 7 illustrates routing method 700 usable in a switch built in accordance with at least some embodiments. The switch receives a data packet in block 702, and determines the destination of the data packet in block 704. This determination may be made comparing routing information stored in the switch with the destination of the data packet. The routing information may describe which busses and devices are accessible through a particular port (e.g., segment numbers within the PCI bus architecture). Based on the destination, the switch attempts to determine a route to the destination through the switch (block 706). If a route is not found (block 708), the data packet is not routed (block 710). It should be noted that a packet should always be routable, and a failure to route a packet is considered an exception condition that is intercepted and handled by the management node. If a route is found (block 708) and the determined route is through an active path (block 712), then the data packet is routed towards the destination through the identified active path (block 714). If a route is found and the determined route is through an alternate path (block 716), then the data packet is routed towards the destination through the identified alternate path (block 718). After determining the path of the route (if any) and routing the data packet (if possible), routing is complete (block 720).

By adapting a rooted hierarchical interconnect bus to operate as a network switch fabric as described above, the various nodes coupled to the network switch fabric can communicate with each other at rates comparable to the transfer rates of the internal busses within the nodes. By providing high performance end-to-end transfer rates across the network switch fabric, different nodes interconnected to each other by the network switch fabric, as well as the individual component devices within the nodes, can be combined to form high-performance virtual machines. This is accomplished by creating a virtual bus in which the network switch fabric is not visible to each node's operating system, and instead the operating systems executing on the CPUs of each node can communicate with component devices on other nodes as if the CPUs and component devices of each node were coupled to a single interconnect bus.

Figure 8A:
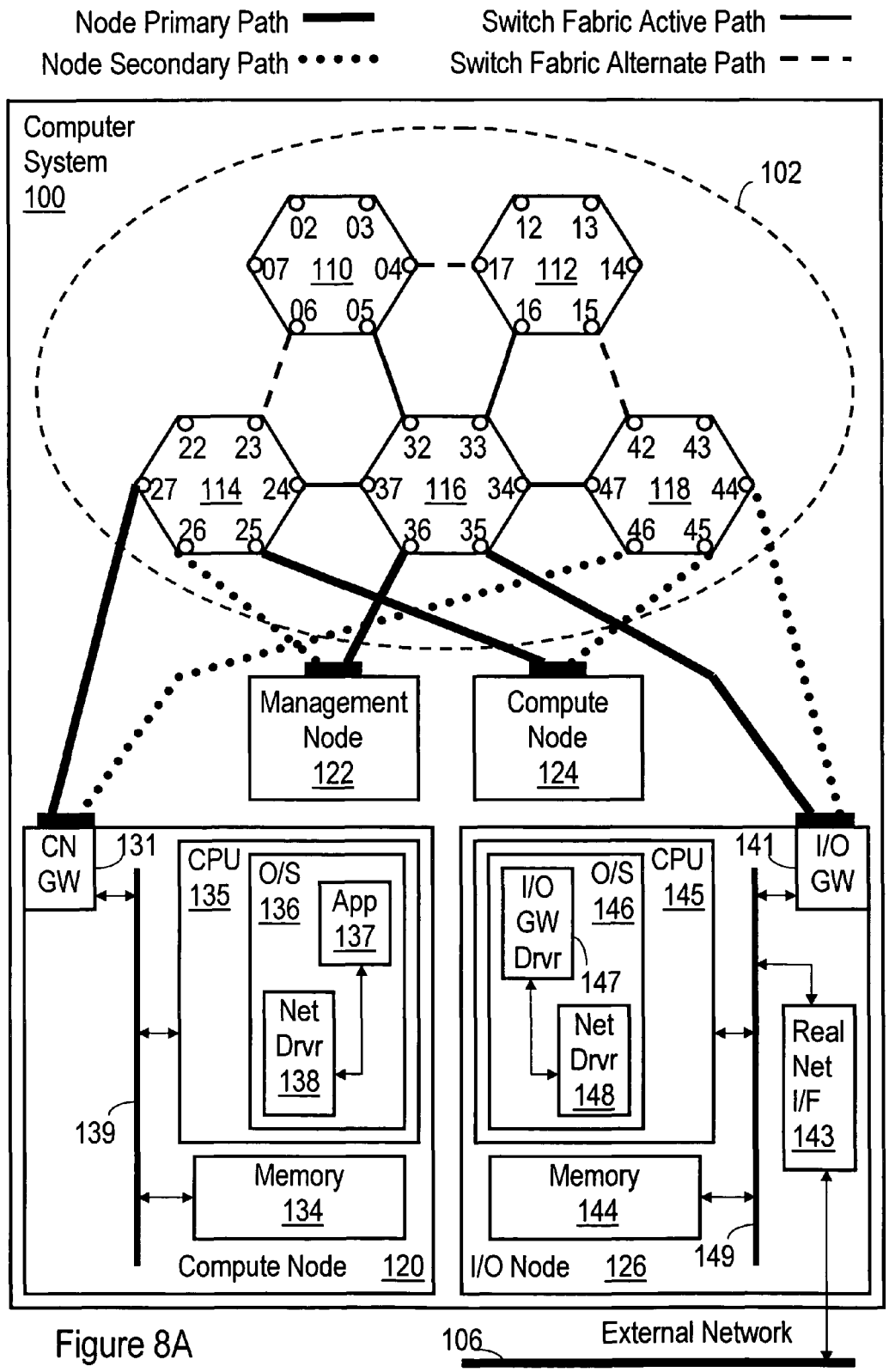
FIG. 8A shows internal details of a compute node and an I/O node that are part of a computer system constructed in accordance with at least some embodiments.

FIG. 8A shows an illustrative embodiment configured to implement virtual machines over a virtual bus. Compute node 120 comprises a CPU 135, memory 134, and compute node gateway (CN GW) 131, each coupled to an internal PCI bus 139. Operating system (O/S) 136, application program (App) 137, and network driver (Net Drvr) 138 are software programs that execute on CPU 135. Both application program 137 and network driver 138 execute within the environment created by operating system 136. I/O node 126 similarly comprises a CPU 145, memory 134, I/O gateway 141, and real network interface (Real Net I/F) 143, each coupled to an internal PCI bus 149. O/S 146 executes on CPU 145, as does I/O gateway driver (I/O GW Drvr) 147 and network driver 148, which execute within the environment created by O/S 146.

Compute node gateway 131 and I/O gateway 141 each act as an interface to network switch fabric 102, and provide an abstraction layer that allows components of each node to communicate with components of other nodes without having to interact directly with the network switch fabric 102. Each gateway described in the illustrative embodiments disclosed comprises a controller that implements the aforementioned abstraction layer. The controller may comprise a hardware state machine, a CPU executing software, or both. Further, the abstraction layer may be implemented by hardware and/or software operating within the gateway alone (e.g., the embodiment of FIG. 12), or may be implemented as gateway hardware and/or software operating in concert with driver software executing on a separate CPU (e.g., the embodiment of FIG. 8A). Other combinations of hardware and software may become apparent to those skilled in the art, and the present disclosure is intended to encompass all such combinations.

Figure 8B:
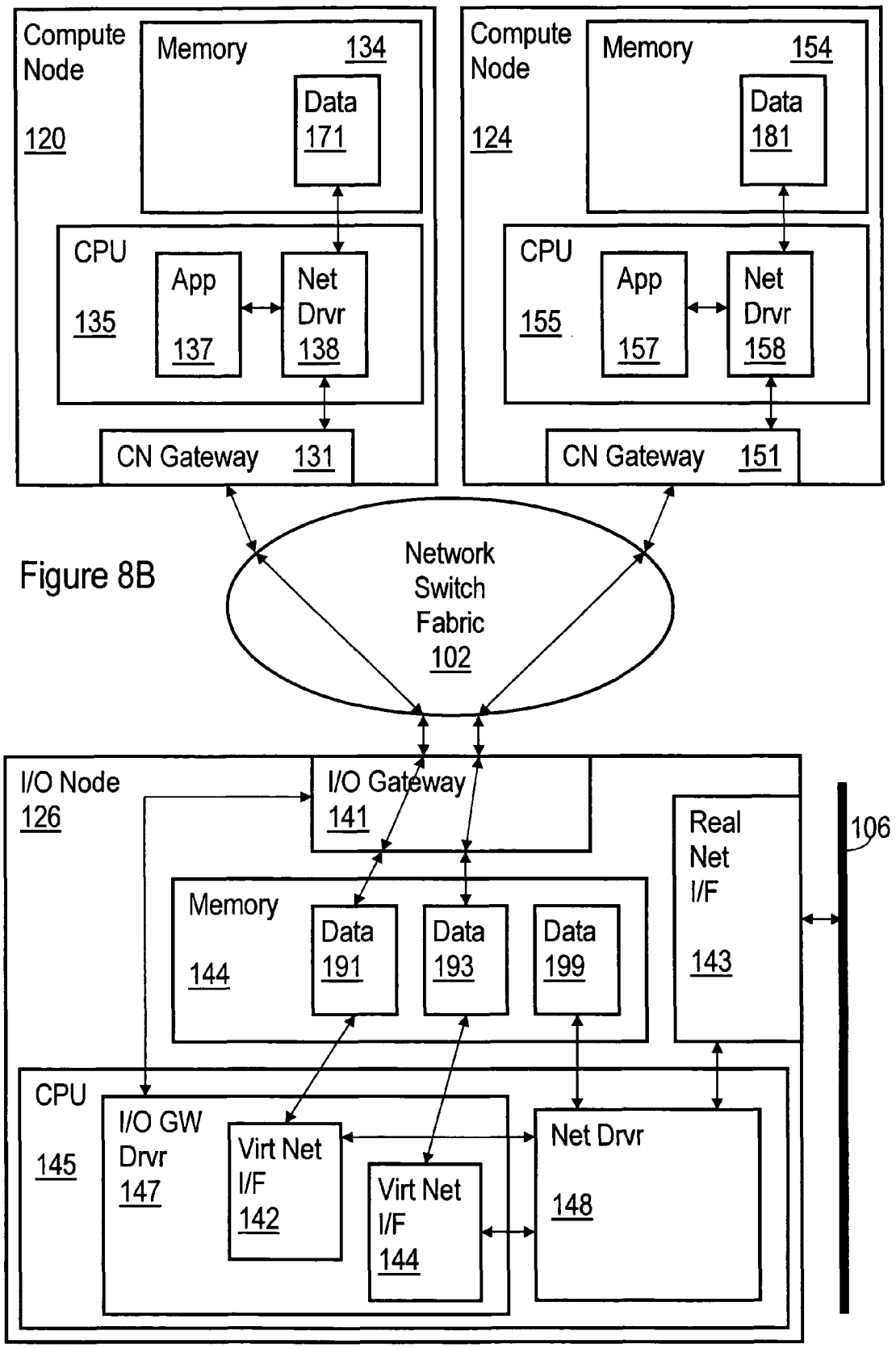
FIG. 8B shows how data flows through the computer system of FIG. 8A, in accordance with at least some embodiments.

FIG. 8B shows the flow of data between the components of the illustrative embodiment of FIG. 8A. Application program 137, executing on compute node 120, communicates across external network 106 via network driver 138, compute node gateway 131, network switch fabric 102, I/O gateway 141, virtual network interface (Virt Net I/F) 142, network driver 148, and real network interface 143. Data space (Data) 171, maintained in memory 134, is used to store configuration information, to store intermediate data, and as a buffer for data being exchanged between application program 137 and external network 106. Compute node gateway 131 provides an abstraction layer that hides the underlying network switch fabric 102 that couples to both compute node 120 and I/O node 126. Because of this abstraction layer, compute node gateway 131 appears to compute node 120 as a PCI bridge. The network device visible to compute node 120 (virtual network device 142) appears as a device on the other side of this PCI bridge, and is enumerated and mapped into the memory space of compute node 120 in the same manner as any other PCI device within compute node 120.

Compute node gateway 131 communicates across network switch fabric 102 with I/O gateway 141. I/O gateway 141 communicates with virtual network interface 142, which appears to network driver 138 on compute node 120 as a physical network interface (similar to real network interface 143) directly connected to the internal bus of compute node 120. The abstraction noted above causes the intervening gateways (131 and 141) and network switch fabric 102 to be transparent to network driver 138 and virtual network interface 142. Virtual network interface 142 is one of several similar interface components within I/O gateway driver 147, which executes on CPU 145 of I/O node 126. Each virtual network interface (142 and 144) communicates with network driver 148 (also executing on CPU 145), which communicates with real network interface 143. Each virtual network interface (142 and 144) is exposed to the network by I/O gateway 141 and is thus made accessible for use by other nodes once a virtual network interface is associated with a particular host (described below).

Each virtual network interface (142 and 144) uses configuration information and data stored in data space (Data) 191 and 193, which is maintained within memory 144 of I/O node 126 in a manner similar to network driver 138 on compute node 120. Data space 191 and 193 are also each used as data transfer buffers for data communicated to and from virtual network drivers 142 and 144 respectively. Network driver 148 also accesses configuration information and data stored in data space (Data) 199, which is also maintained within memory 144. Each virtual network interface may be configured independently, the configuration for each virtual network interface being stored in the corresponding data space maintained within memory 144. The virtual network interface is "virtual" because the data structures and memory locations associated with the virtual network interface (e.g., the "dummy" PCI configuration space associated with the virtual device presented) are separate from those of the actual physical device (e.g., real network interface 143). These data structures and memory locations represent an abstracted representation of the physical device that may be configured independently from the actual physical device.

By using an abstraction layer, the individual components, such as for example CPU 135 and virtual network interface 142, do not need to be capable of directly communicating across the network switch fabric 102 using the underlying rooted hierarchical bus protocol of the hierarchical bus of network switch fabric 102 (managed and enumerated by management node 122 of FIG. 8A). Instead, each component formats outgoing messages according to the protocol of the internal bus (139 or 149) and the corresponding gateway for that node (131 or 141) encapsulates the outgoing message according to the protocol of the underlying rooted hierarchical bus protocol of the network switch fabric 102. Incoming messages are similarly unencapsulated by the corresponding gateway for a node.

Figure 9:
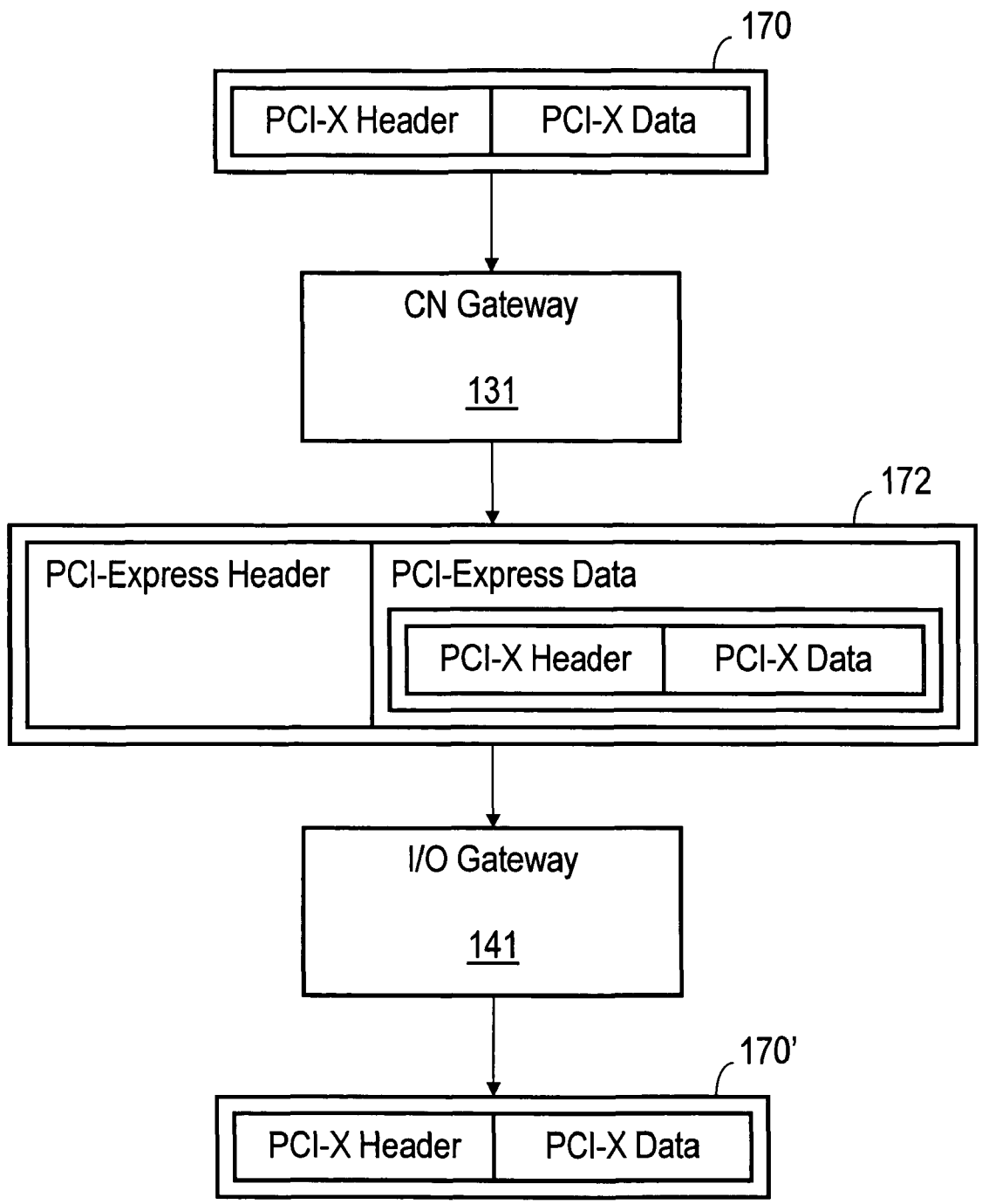
FIG. 9 shows how PCI-X messages are encapsulated within PCI-Express messages in accordance with at least some embodiments.

Referring to the illustrative embodiments of FIGS. 8A, 8B and 9, if CPU 135 of compute node 120 is sending data to external network 106 via virtual network interface 142 of I/O node 126, CPU 135 presents the data to internal bus 139 according to the protocol of that bus, for example, as PCI-X message 170. PCI-X message 170 is encapsulated by compute node gateway 131 to form a message formatted according to the underlying rooted hierarchical bus protocol of network switch fabric 102, for example, as PCI Express message 172. Network switch fabric 102 routes PCI Express message 172 to I/O node 126, where I/O node gateway 141 extracts the original unencapsulated message 170' and presents it on internal bus 149. Virtual network interface 142 receives the original unencapsulated message 170' and then proceeds to process, format, and forward the original data to external network 106 via network driver 148 and real network interface 143.

It should be noted that although the encapsulating protocol is different from the encapsulated protocol in the example described, it is possible for the underlying protocol to be the same protocol for both. Thus for example, both the internal busses of compute node 120 and I/O node 126 and the network switch fabric may all use PCI express as the underlying protocol. In such a configuration, the abstraction still serves to hide the existence of the underlying hierarchical bus of the network switch fabric 102, allowing selected components of the compute node 120 and the I/O node 126 to interact as if communicating with each other over a single bus.

Figure 10A:
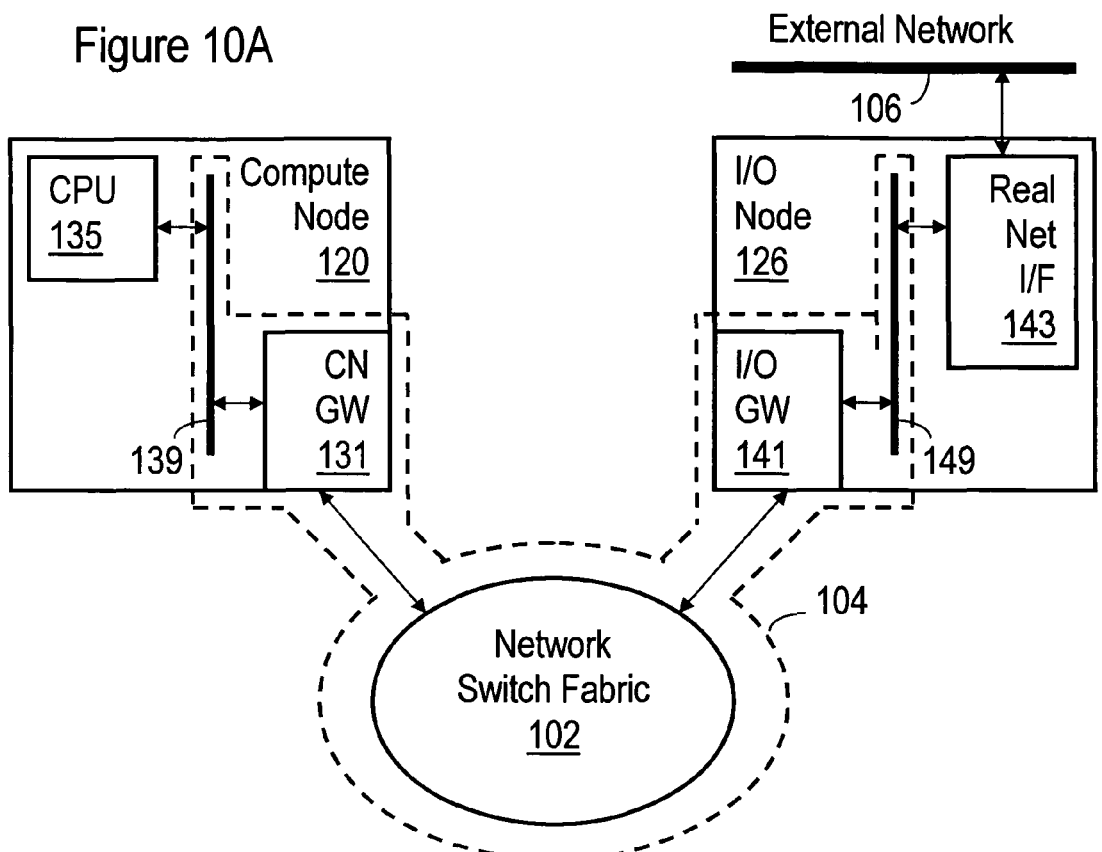
FIG. 10A shows how components of a compute node and an I/O node combine to form a virtual bus in accordance with at least some embodiments.
Figure 10B:
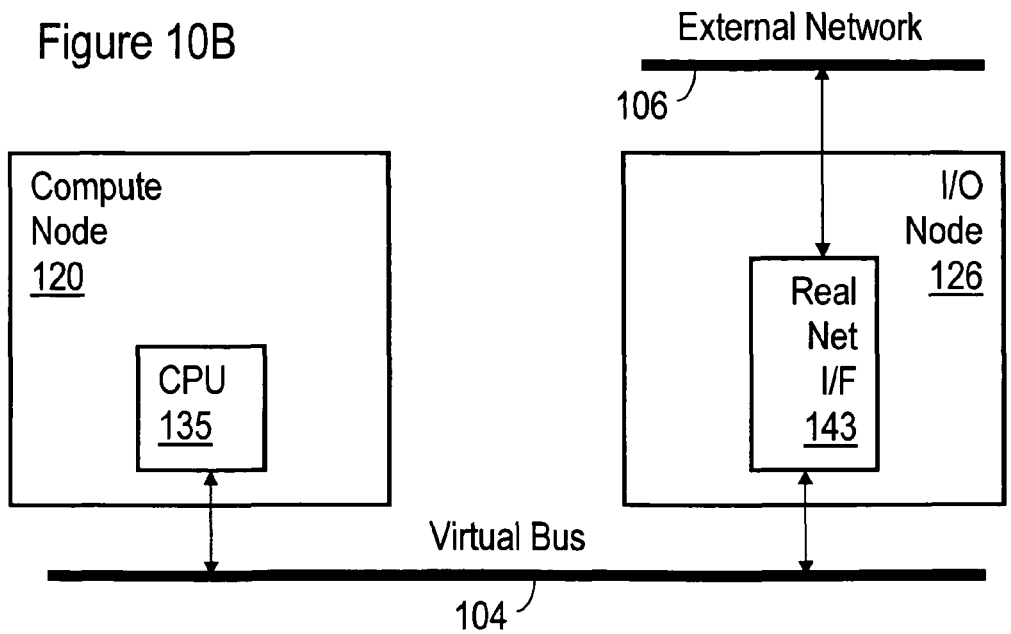
FIG. 10B shows a representation of a virtual bus between components of a compute node and components of an I/O node in accordance with at least some embodiments.

The encapsulation and abstraction provided by compute node gateway 131 and I/O gateway 141 are performed transparently to the rest of the components of each of the corresponding nodes. As a result, the CPU 135 and virtual network interface 142 each behave as if they were communicating across a single virtual bus 104, as shown in FIGS. 10A and 10B. Because the gateways provide the encapsulation/unencapsulation as messages are being sent and received, and because the underlying rooted hierarchical bus of the network switch fabric 102 has a level of performance comparable to that of the internal busses 139 and 149, little delay is added to bus message transactions as a result of the encapsulation and unencapsulation of internal bus messages. Also, because the internal busses 139 and 149 require no modification, existing components (e.g., CPUs and network interfaces) may be used within the system without the need for hardware modifications or special software drivers. The existence of the gateways and the functionality they provide is invisible to the rest of the hardware, as well as to the operating systems 136 and 146 executing on the CPUs of nodes 120 and 126 respectively (see FIGS. 8A and 8B).

Each gateway allows selected virtual devices within one node to appear as endpoints within the bus hierarchy of another node. Thus, for example, virtual network interface 142 of FIG. 8B appears as an endpoint within the bus hierarch of computed node 120, and is accordingly enumerated by compute node 120. The real device (e.g., real network interface 143) that is "virtualized," however, continues to be an enumerated device within the internal bus of the node which the device is a part of (e.g., I/O node 126 for real network interface 143). The gateway itself appears as an endpoint within the underlying bus hierarchy of the network switch fabric 102 (managed and enumerated by management node 122 of FIG. 8A). Thus, for example, if I/O node 126 of FIG. 8A initializes I/O gateway 141 after the network switch fabric 102 has been initialized and enumerated by management node 122 as previously described, I/O gateway 141 will generate a plug-and-play event on the underlying PCI-Express bus of the network switch fabric 102. The management node 122 will respond to the event by enumerating I/O gateway 141, thus treating it as a new endpoint. During the enumeration, management node 122 obtains and stores information about the virtual network interfaces (142 and 144) exposed by I/O gateway 141. Subsequently, the management node 122 can associate a virtual network interface with a host. For example, virtual network interface 142 is associated with compute node 120 in FIG. 8B.

Figure 11:
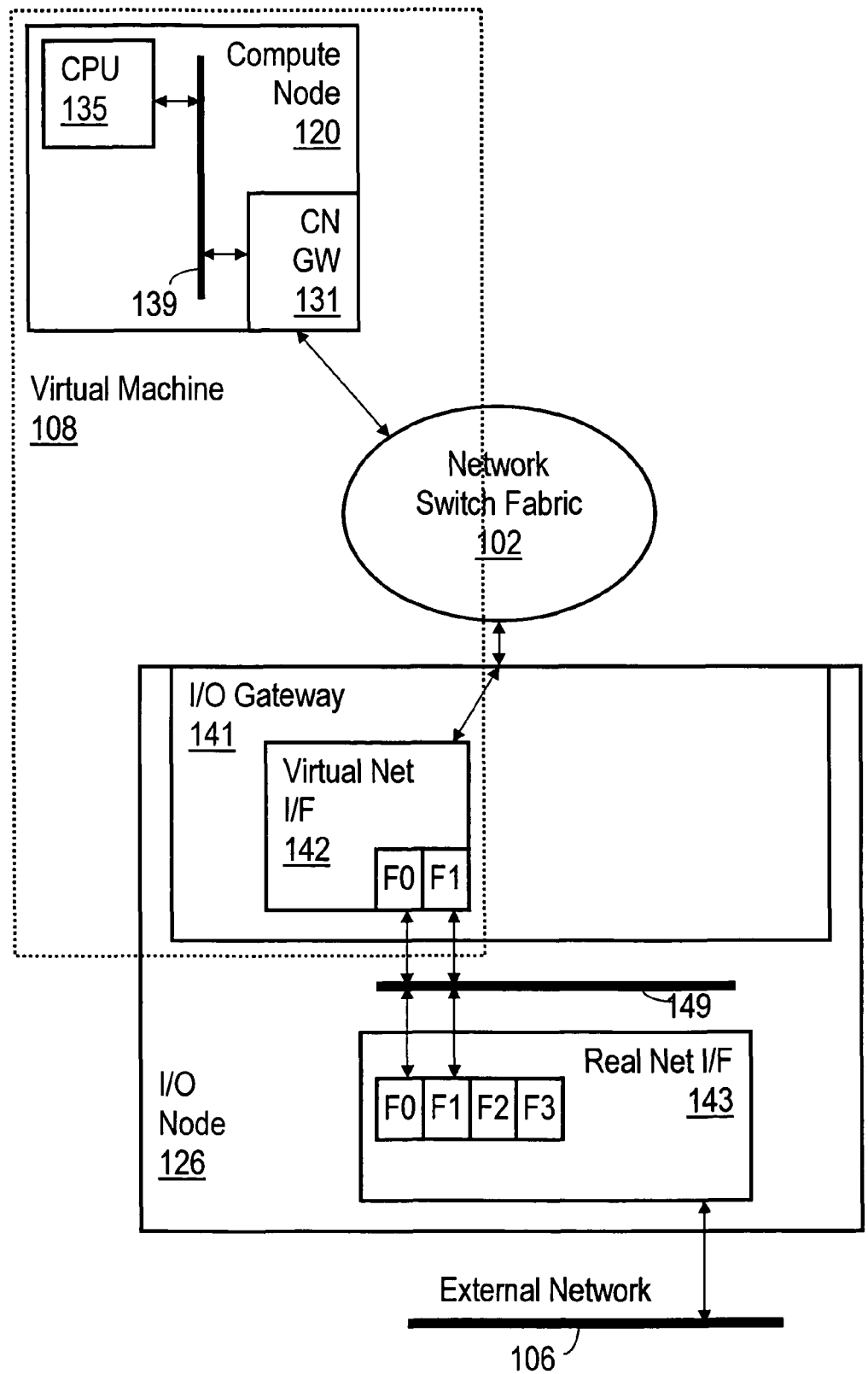
FIG. 11 shows a virtual machine created by a combination of components of both a compute node and an I/O node in accordance with at least some embodiments.

FIG. 11 shows an illustrative embodiment that implements virtual network interface 142 within I/O gateway 141 and maps it to real network interface 143. In the embodiment shown, I/O gateway 141 may, for example comprise a processor executing software, or a hardware state machine, which allows multiple virtual network interfaces to be implemented directly within the gateway in a manner similar to the implementation within I/O gateway driver 147 (executing on CPU 145) of the illustrative embodiment of FIG. 8B. Other designs for implementing I/O gateway 141 will become apparent to those skilled in the art, and all such designs are intended to be within the scope of the present disclosure. Continuing to refer to FIG. 11, real network interface 143 is a single-host PCI-X device, capable of supporting multiple function codes. Each function code (F0 through F4 in the example shown) represents a PCI function code supported by real network interface 143. In the illustrative embodiment shown in FIG. 11, I/O gateway 141 maps functions F0 and F1 of virtual network interface 142 to functions F0 and F1 of real network interface 143. Thus, virtual network interface 142 will have the functionality defined for functions F0 and F1 of real network interface 143. Although a single-host PCI-X device is described, those of ordinary skill in the art will recognize that other embodiments may incorporate non-PCI multi-function devices, as well as other devices capable of making multiple mappable instances of the device accessible to one or more hosts, and all such embodiments and devices are intended to be within the scope of the present disclosure.

Referring again to FIGS. 8A and 11, once I/O gateway 141 has been initialized as an endpoint within the rooted hierarchical bus underlying network switch fabric 102, management node 122 may then assign the virtual network interface 142 to a compute node. Management node 122 triggers this assignment by causing a plug-and-play event to take place that is directed at the target compute node. The target compute node responds and recognizes the device as if it were directly connected to its own internal bus. Since only the one compute node sees the plug-and-play event, only that one compute node recognizes virtual network interface 142. Thus, virtual network interface 142 appears to the target compute node (e.g., compute node 120) as a dedicated, single-host device, visible only to that compute node. FIG. 11 illustrates an example of the result of the above-described sequence, which is the creation of virtual machine 108 comprising compute node 120 and virtual network interface 142. Virtual network interface 142 behaves as a dedicated, single-host network interface that provides access to external network 106, and that is available for the exclusive use of compute node 120.

Figure 12:
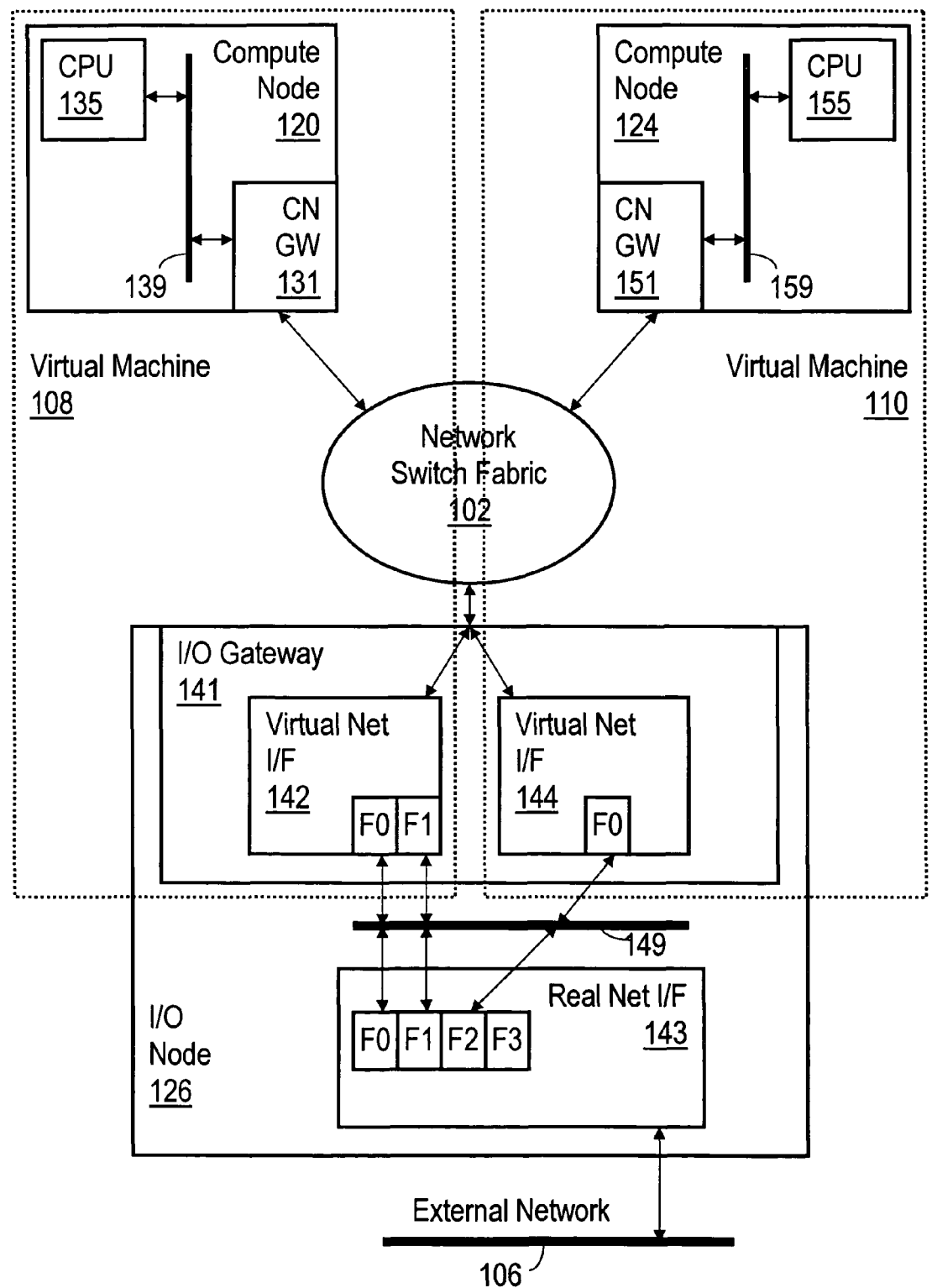
FIG. 12 shows multiple virtual machines created by a combination of components of two compute nodes and a single network interface in accordance with at least some embodiments.

As already noted, virtual device 142, created by I/O gateway 141, is mapped to one of several available function codes. Because the real network interface 143 may have a plurality of function codes, a plurality of virtual network interfaces may be created, each corresponding to a function code of the real network interface 143. Also, more than one function code may be assigned to a single virtual network interface. FIG. 12 shows an illustrative embodiment with two virtual network interfaces 142 and 144. Each virtual network interface is created by I/O gateway 141 as described above. Functions F0 and F1 of virtual network interface 142 maps to functions F0 and F1 of real network interface 143, while function F0 of virtual network interface 144 maps to function code F2 of real network interface 143.

In the example shown, compute node 120 is combined with virtual network interface 142 to form virtual machine 108. Similarly, compute node 122 (comprising compute node gateway 151 and CPU 155, each coupled to internal bus 159) is combined with virtual network interface 144 to form virtual machine 110. Each compute node communicates with external network 106 via real network interface 143, and each node communicates with its corresponding virtual network interface as a dedicated, single-host device. The communications of one node with real single host network interface 143 (via the corresponding virtual network interface) are completely transparent to the other node. In this manner, an existing, single-host network interface such as real network interface 143 can be operated as a multi-host device without modifying the hardware or software of the physical network interface 143, the internal bus of the I/O node 126, or the software executing on CPUs 135 and 155 (such as the operating systems or any of the existing device drivers).

The translation and remapping of memory and I/O accesses, as well as of configuration and data messages are both handled by the virtual network interfaces (e.g., virtual network interface 142), which each communicate with the real network interface 143. The virtual devices thus arbitrate access by multiple hosts to the real device and effect a translation function between PCI domains (e.g., between the PCI domain defined by the bus hierarchy of compute node 120 and the PCI domain defined by the bus hierarchy that includes real network interface 143 and bus 149). Communications between the I/O gateway 141 and the real network interface 143 are performed as defined by the internal bus protocol of the compute node (PCI-X in the illustrative embodiment of FIG. 12). Communications between the compute nodes (120 and 122) and their corresponding virtual network interfaces (142 and 144) over the virtual bus as described above are performed using an internal bus protocol according to rules defined by the virtual I/O device to which the compute node is bound.

Figure 13:
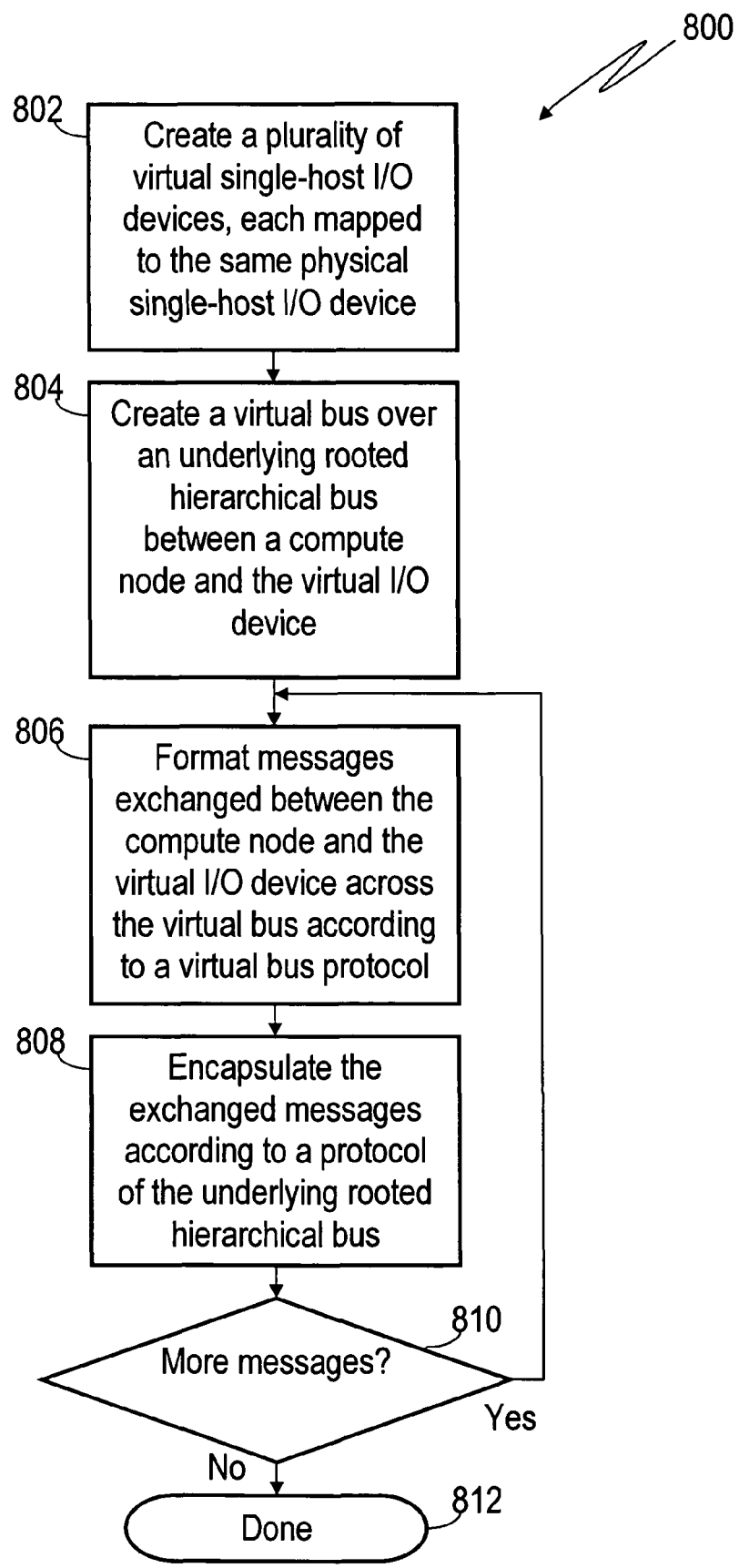
FIG. 13 shows a method for creating virtual machines in accordance with at least some embodiments.

At least some of the functionality implemented by the illustrative embodiments described above is embodied in illustrative method 800, shown in FIG. 13. A plurality of virtual I/O devices are first created, each of which map to the same physical single-host I/O device (block 802). A virtual bus is then created over an underlying rooted hierarchical bus (operating as a network switch fabric) to create a communication path between a compute node and one of the virtual I/O devices created, as shown in block 804. The virtual bus may be created by associating a selected virtual I/O device with a compute node as previously described. The virtual bus segment so created represents an extension of the rooted bus hierarchy of the compute node. This hierarchy is separate from, and superimposed upon, the underlying rooted hierarchical bus of the network switch fabric. Once the virtual I/O device and virtual bus are created, messages that are exchanged across the virtual bus between the compute node and the virtual I/O device are formatted in block 806 according to a protocol defined for the virtual bus (e.g., PCI-X). These formatted messages are further encapsulated in block 808 according to a protocol defined for the rooted hierarchical bus of the network switch fabric underlying the virtual bus (e.g., PCI Express). This process then continues until there are no more messages to be transferred (e.g., when the system is shut down or reconfigured), as shown in blocks 810 and 812.

The above discussion is meant to be illustrative of the principles and various embodiments of the present invention. Numerous variations and modifications will become apparent to those skilled in the art once the above disclosure is fully appreciated. For example, although many of the embodiments of the present disclosure are described in the context of a PCI bus architecture, other similar bus architectures may also be used (e.g., Hyper-Transport, RapidIO). Further, a variety of combinations of technologies are possible and not limited to similar technologies. Thus, for example, nodes using PCI-X-based internal busses may be coupled to each other with a network switch fabric that uses an underlying Rapid I/O bus. Additionally, other single-host devices, beyond network interfaces, may be extended using the systems and methods described in the present disclosure. These include, but are not limited to, mass storage device interfaces, and non-network communication interfaces. Also, although the present disclosure describes dedicated, single-host virtual devices, other embodiments within the scope of this disclosure may include shared and multi-host virtual devices. Many other embodiments are within the scope of the present disclosure, and it is intended that the following claims be interpreted to embrace all such variations and modifications.

What is claimed is:

1. A computer system, comprising:
a network switch fabric comprising a rooted hierarchical bus;
a first compute node coupled to the network switch fabric; and
an input/output (I/O) node coupled to the network switch fabric, the I/O node comprises a network switch fabric interface and a real single-host device;
wherein the network switch fabric interface creates a first virtual device mapped to the real single-host device; and
wherein the first virtual device allows the first compute node to access the real single-host device through a virtual bus comprising the rooted hierarchical bus and a internal bus of the I/O node.

2. The computer system of claim 1, further comprising a virtual machine that comprises the first compute node and the first virtual device, each communicating with the other over the virtual bus, wherein the virtual bus, the internal bus of the compute node and the internal bus of the I/O node each operate using a same first bus protocol.

3. The computer system of claim 2, wherein a message is transferred between the first compute node and the first virtual device, said message formatted according to the first bus protocol, and said formatted message further encapsulated according to a second bus protocol defined for the network switch fabric.

4. The computer system of claim 3, wherein the first bus protocol comprises at least one of the group consisting of a peripheral component interconnect (PCI) bus protocol, a PCI-Express bus protocol, and a PCI extended (PCI-X) bus protocol.

5. The computer system of claim 3, wherein the second bus protocol comprises at least one of the group consisting of a PCI bus protocol, a PCI-Express bus protocol, and a PCI-X bus protocol.

6. The computer system of claim 1, further comprising a second compute node coupled to the network switch fabric, wherein the network switch fabric interface creates a second virtual device mapped to the real single-host device, and wherein the second virtual device allows the second compute node to access the real single-host device.

7. The computer system claim 6, wherein access by the first compute node to the real single-host device is transparent to the second compute node, and wherein access by the second compute node to the real single-host device is transparent to the first compute node.

8. The computer system of claim 1, further comprising a management node coupled to the network switch fabric, wherein the management node configures the first virtual device.

9. The computer system of claim 1, wherein the architecture of the rooted hierarchical bus comprises at least one of the group consisting of a PCI bus architecture, a PCI-Express bus architecture, and a PCI-X bus architecture.

10. The computer system of claim 9, wherein the first virtual device is mapped to one of a plurality of PCI functions of the real single-host device.

11. An apparatus, comprising:
a network interface configured to couple to a rooted hierarchical bus-based network switch fabric;
a controller; and
a bus interface configured to couple to a bus and to allow the controller to communicate with a physical I/O device coupled to the bus;
wherein the controller creates a plurality of virtual I/O devices that are each accessible over the network switch fabric; and
wherein at least one of the plurality of virtual I/O devices provides network access to the physical I/O device through a virtual bus comprising the rooted hierarchical bus-based network switch fabric and the bus.

12. The apparatus of claim 11,
wherein the controller comprises a central processing unit (CPU) executing a software program; and
wherein the software program creates the plurality of virtual I/O device interfaces.

13. The apparatus of claim 11, wherein the controller comprises a hardware state machine that creates the plurality of virtual I/O device interfaces.

14. The apparatus of claim 11, wherein the virtual I/O device is configured to be part of a virtual machine.

15. A method, comprising:
creating a plurality of virtual input/output (I/O) devices that each provides access to a physical single-host I/O device; and
creating a virtual bus between a virtual I/O device of the plurality of virtual I/O devices and a compute node, the virtual bus comprising an underlying rooted hierarchical bus-based network switch fabric and a bus of the physical single-host I/O device.

16. The method of claim 15, wherein associating the virtual I/O device with the compute node creates the virtual bus.

17. The method of claim 16, wherein a management node performs the associating.

18. The method of claim 15, further comprising:
formatting one or more messages, exchanged between the compute node and the virtual single-host I/O device across the virtual bus, according to a virtual bus protocol; and
encapsulating one or more formatted messages according to a bus protocol of the underlying rooted hierarchical bus-based network switch fabric.

19. The method of claim 18, wherein the virtual bus protocol comprises at least one of the group consisting of a peripheral component interconnect (PCI) bus protocol, a PCI-Express bus protocol, and a PCI extended (PCI-X) bus protocol.

20. The method of claim 18, wherein the physical bus protocol comprises at least one of the group consisting of a peripheral component interconnect (PCI) bus protocol, a PCI-Express bus protocol, and a PCI extended (PCI-X) bus protocol.

21. The method of claim 15, wherein creating a virtual bus comprises associating the compute node with the virtual single-host I/O device by mapping a virtual I/O device interface of the plurality of virtual I/O device interfaces to a PCI function of the single physical I/O device.

22. The method of claim 15, wherein creating a virtual bus comprises configuring a virtual I/O device interface of the plurality of virtual I/O device interfaces using a management node coupled to the underlying rooted hierarchical bus-based network switch fabric.

23. A computer system, comprising:
a means for interfacing a network switch fabric to a computer bus;
a means for computing coupled to the means for interfacing through the network switch fabric; and
a means for input and output (I/O) of data coupled to the means for interfacing through the computer bus;
wherein the means for interfacing creates a plurality of virtual devices; and
wherein the means for computing accesses the means for I/O of data through a virtual device of the plurality of virtual devices, the virtual device comprising a virtual bus comprising the network switch fabric and the computer bus.

24. An apparatus, comprising:
a means for networking, configured to communicate with a plurality of network devices;
a means for controlling; and
a means for communicating configured to exchange data with a physical input and output (I/O) device;
wherein the means for controlling creates a plurality of virtual I/O devices that are each accessible by the plurality of network devices; and
wherein a virtual I/O device of the plurality of virtual I/O devices provides a network device of the plurality of network devices with access to the physical I/O device via the virtual I/O device, the virtual I/O device comprising a virtual bus comprising the means for networking and a bus of the physical I/O device.

* * * * *

UNITED STATES PATENT AND TRADEMARK OFFICE
CERTIFICATE OF CORRECTION

| | | |
|---|---|---|
| PATENT NO. | : 8,176,204 B2 | Page 1 of 1 |
| APPLICATION NO. | : 11/450491 | |
| DATED | : May 8, 2012 | |
| INVENTOR(S) | : Dwight D. Riley | |

It is certified that error appears in the above-identified patent and that said Letters Patent is hereby corrected as shown below:

In column 12, line 38, in Claim 7, after "system" insert -- of --.

Signed and Sealed this
Twenty-seventh Day of November, 2012

David J. Kappos
*Director of the United States Patent and Trademark Office*